US012508193B1

(12) United States Patent
Huang et al.

(10) Patent No.: US 12,508,193 B1
(45) Date of Patent: Dec. 30, 2025

(54) MASSAGE DEVICE

(71) Applicant: Junpeng Wu, Shenzhen (CN)

(72) Inventors: Tenghui Huang, Guangdong (CN); Junpeng Wu, Shenzhen (CN)

(73) Assignee: Junpeng Wu, Shenzhen (CN)

( * ) Notice: Subject to any disclaimer, the term of this patent is extended or adjusted under 35 U.S.C. 154(b) by 0 days.

(21) Appl. No.: 19/006,188

(22) Filed: Dec. 30, 2024

(30) Foreign Application Priority Data

Dec. 23, 2024 (CN) ......................... 202423186200.9

(51) Int. Cl.
*A61H 19/00* (2006.01)
*A61H 9/00* (2006.01)
*A61H 23/02* (2006.01)

(52) U.S. Cl.
CPC ........... *A61H 19/32* (2013.01); *A61H 9/0057* (2013.01); *A61H 23/0254* (2013.01); *A61H 2201/1246* (2013.01); *A61H 2201/1669* (2013.01); *A61H 2201/1671* (2013.01)

(58) Field of Classification Search
CPC ......... A61H 19/30; A61H 19/32; A61H 19/34
See application file for complete search history.

(56) References Cited

U.S. PATENT DOCUMENTS 11,259,987 B1 * 3/2022 Chen ...................... A61H 19/34
12,036,172 B1 * 7/2024 Liu ........................ A61H 23/02
12,208,053 B1 * 1/2025 Liu ...................... A61H 23/006
2022/0071839 A1 * 3/2022 Huang ................... A61H 23/02
2022/0160577 A1 * 5/2022 Cai .................... A61H 23/0263
2022/0175612 A1 * 6/2022 Witt ....................... A61H 19/30
2022/0226186 A1 * 7/2022 Lenke .................... A61H 19/30
2023/0172793 A1 * 6/2023 Witt ....................... A61H 19/34 600/38
2023/0210717 A1 * 7/2023 Witt ....................... A61H 19/34 600/38
2023/0263697 A1 * 8/2023 Liu ........................ A61H 19/34 601/46
2024/0238151 A1 * 7/2024 Liu ........................ A61H 23/02
2024/0238154 A1 * 7/2024 Liu ........................ A61H 9/005
2024/0252390 A1 * 8/2024 Sedic ..................... A61H 19/00
2024/0335350 A1 * 10/2024 Liu ...................... A61H 9/0007
2024/0382376 A1 * 11/2024 Zhang ................ A61H 23/0254
2024/0398656 A1 * 12/2024 Zhong .................. A61H 9/0057
2025/0025371 A1 * 1/2025 Shao ...................... A61H 19/32
2025/0041151 A1 * 2/2025 Cai ........................ A61H 19/30

* cited by examiner

*Primary Examiner* — LaToya M Louis

(57) ABSTRACT

A massage device includes a shell and a pump mounted inside the shell. The shell includes a main body and a massage member provided at one end of the main body. The massage member includes an outer wall and an inner wall concaved inwardly from a distal end of the outer wall, a first chamber is defined in the inner wall for accommodating a part of a human body to be massaged therein, and a second chamber is defined in the shell and around the inner wall, wherein the first chamber is not communicated with the second chamber. The pump is connected to the second chamber for changing a pressure inside the second chamber, so as to make the inner wall deform.

20 Claims, 11 Drawing Sheets

MASSAGE DEVICE

CROSS-REFERENCE TO RELATED APPLICATIONS

This application claims priority to Chinese Patent Application No. 202423186200.9, filed on Dec. 23, 2024. The content of the aforementioned application, including any intervening amendments thereto, are incorporated herein by reference.

TECHNICAL FIELD

The present application relates to the technical field of healthcare devices, and in particular to a massage device.

BACKGROUND

In recent years, various massage devices have been developed to help users release stress and relax their body. Conventional massage devices, particularly conventional masturbation devices, such as love eggs, are generally mechanical vibration devices. These devices provide high-frequency vibrations to stimulate sensitive parts of the human body, such as the breasts, the genitals, and etc., which cause strong discomfort and result in poor user experience.

SUMMARY

An object of the present application is to provide a massage device which can provide better stimulation effect.

In order to achieve the above object, an embodiment of the present application provides a massage device, including:

a shell including a main body and a massage member provided at one end of the main body, the massage member including an outer wall and an inner wall concaved inwardly from a distal end of the outer wall, a first chamber being defined in the inner wall for accommodating a part of a human body to be massaged therein, a second chamber being defined in the shell and around the inner wall, wherein the first chamber is not communicated with the second chamber; and a pump being mounted inside the shell and connected to the second chamber.

For the present massage device, the inner wall of the massage member is deformed by pressure changing inside the second chamber rather than that inside the first chamber. In this way, there is no need to form an opening on the inner wall to connect the pump, resulting in better sealing effect of the first chamber and better massage effect of the massage device. Furthermore, liquids in the first chamber, such as lubricants, will not pass through the inner wall into the shell and affect the safety of components, especially electronic components, mounted in the shell. Moreover, the absence of opening on the inner wall facilitates the cleaning of the present massage device, making the use of this device healthier.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 6, a massage device according an embodiment of the present application is shown. In this embodiment, the massage device 100 includes a shell 20 and a driving assembly mounted in the shell 20. The shell 20 includes a main body 22 and a massage member 24 connected to the main body 22. The driving assembly is configured for driving the massage member 24 to move, including but not limited to deform, vibrate, rotate, swing, and etc., so as to stimulate a part of the human body, especially a sensitive part of the human body, attached to the massage member 24, thereby releasing stress and relaxing the body.

Figure 1:
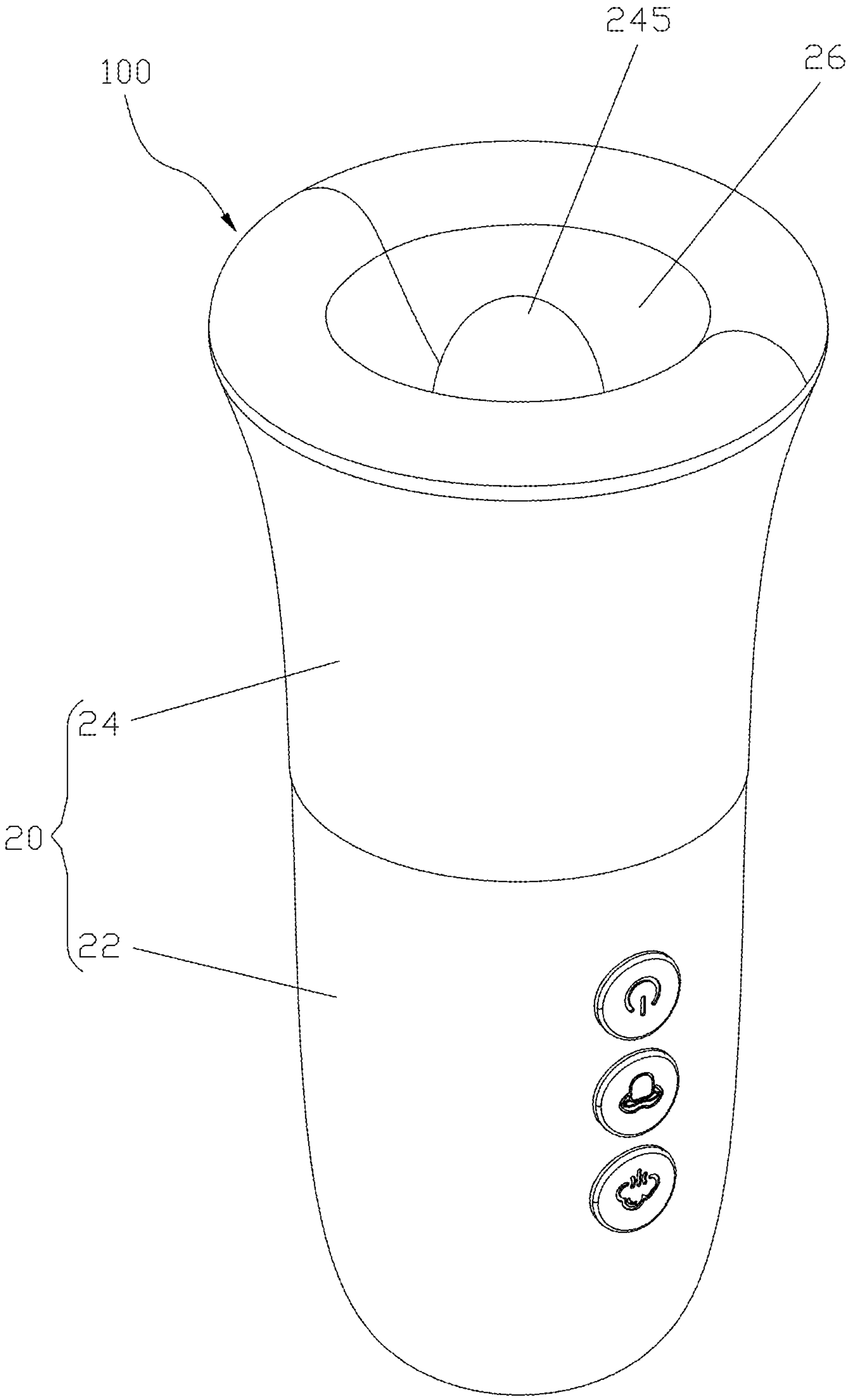
FIG. 1 is an isometric, assembled view of a massage device according to a first embodiment of the present application.
Figure 2:
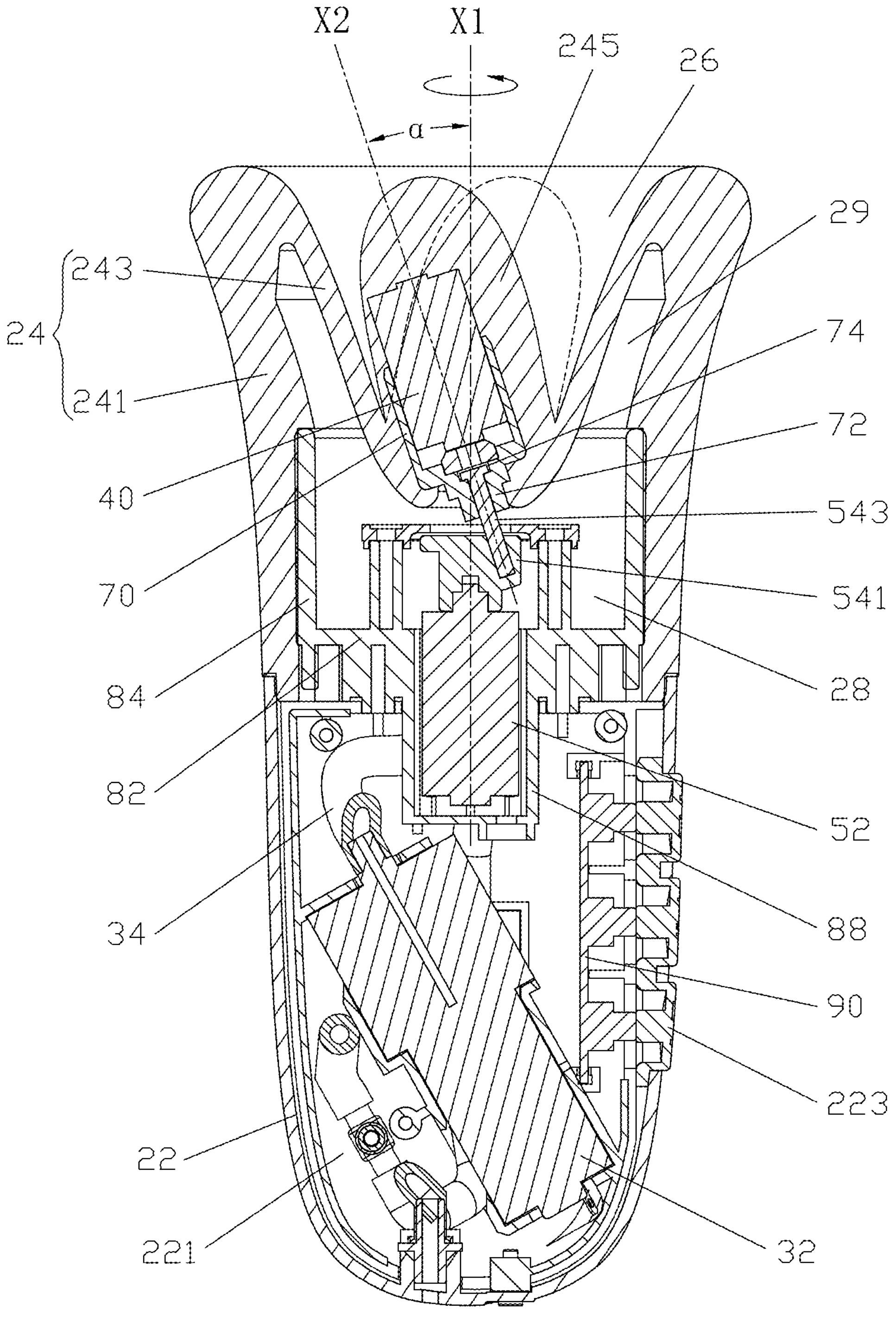
FIG. 2 is a cross sectional view of the massage device of FIG. 1.
Figure 3:
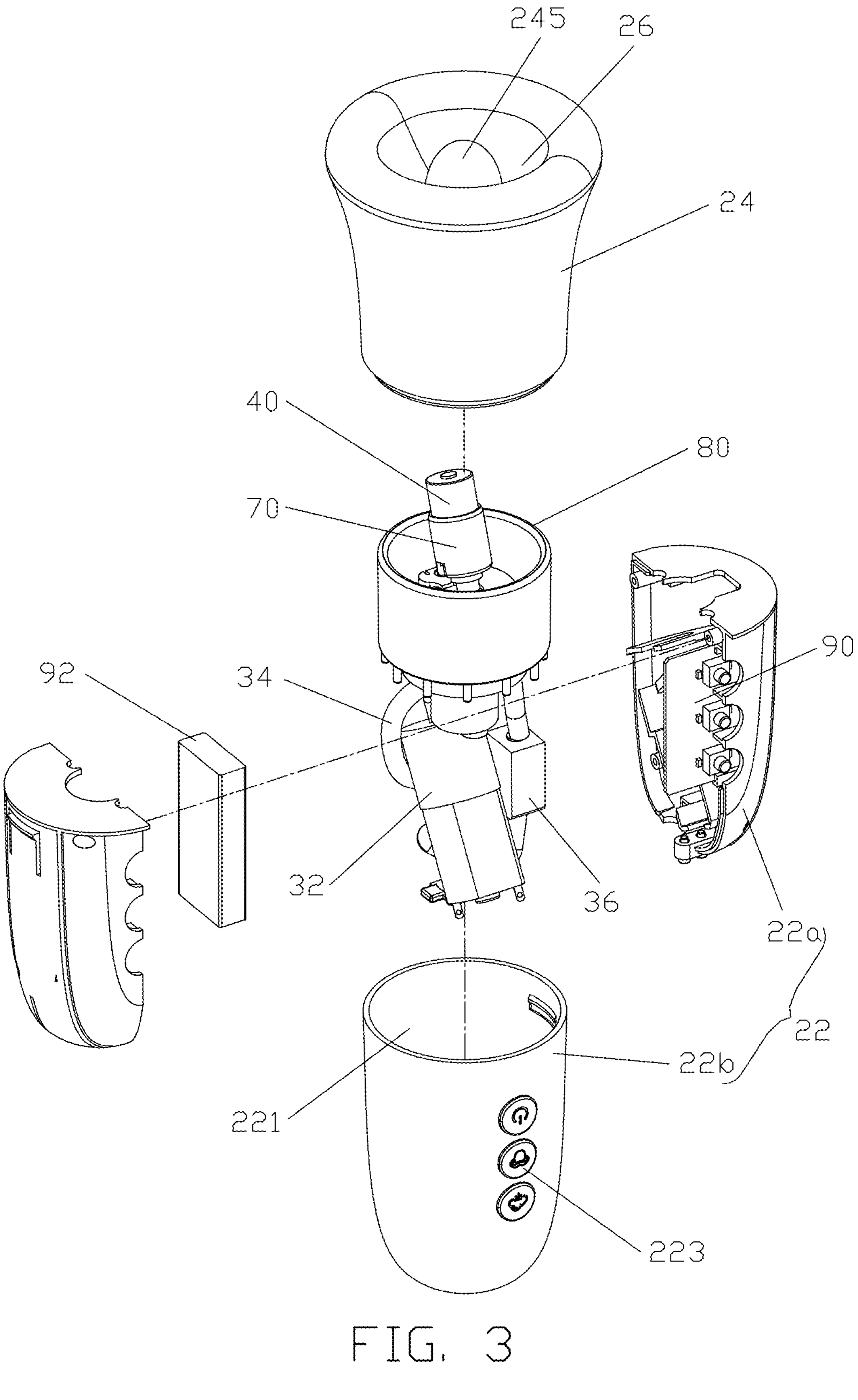
FIG. 3 is a schematic, exploded view of the massage device of FIG. 1.

In this embodiment, as shown in FIG. 1 to FIG. 3, the shell 20 is generally rod-shaped as a whole, and the massage member 24 is provided at a distal end of the shell 20. Specifically, the massage member 24 includes an annular outer wall 241 with a proximal end thereof connected to the main body 22 and an inner wall 243 concaved inwardly (i.e., towards the main body 22) from a distal end of the outer wall 241. A first chamber 26 is defined in the inner wall 243, and a second chamber 28 is defined in the shell 20 and around the inner wall 243. The first chamber 26 and the second chamber 28 are not communicated with each other due to the separation of the inner wall 243.

During use, the distal end of the massage member 24 is attached to a periphery of the part of the human body that is need to be massaged, so that the part to be massaged is generally sealed in the first chamber 26 and wrapped by the inner wall 243 of the massage member 24. The massage member 24, especially the inner wall 243 of the massage member 24, is made of flexible materials, such as silicone, rubber, and etc., so as to not only have a soft touch when it acts on the human body, but also be easily to deform when it subjected to force. In this embodiment, the inner wall 243 and the outer wall 241 are integrally formed as one piece by injection molding.

Figure 3A:
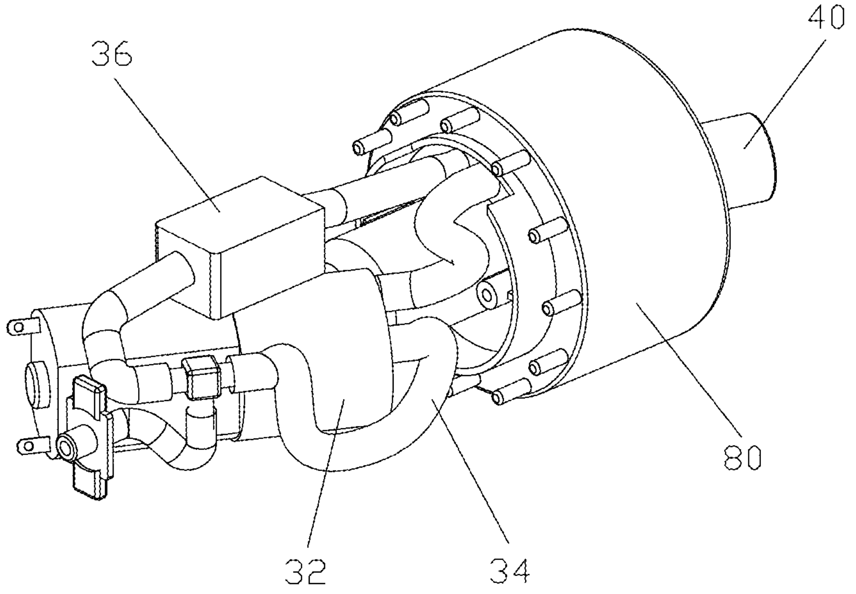
FIG. 3*a* shows a driving assembly of the massage device from another aspect.
Figure 5:
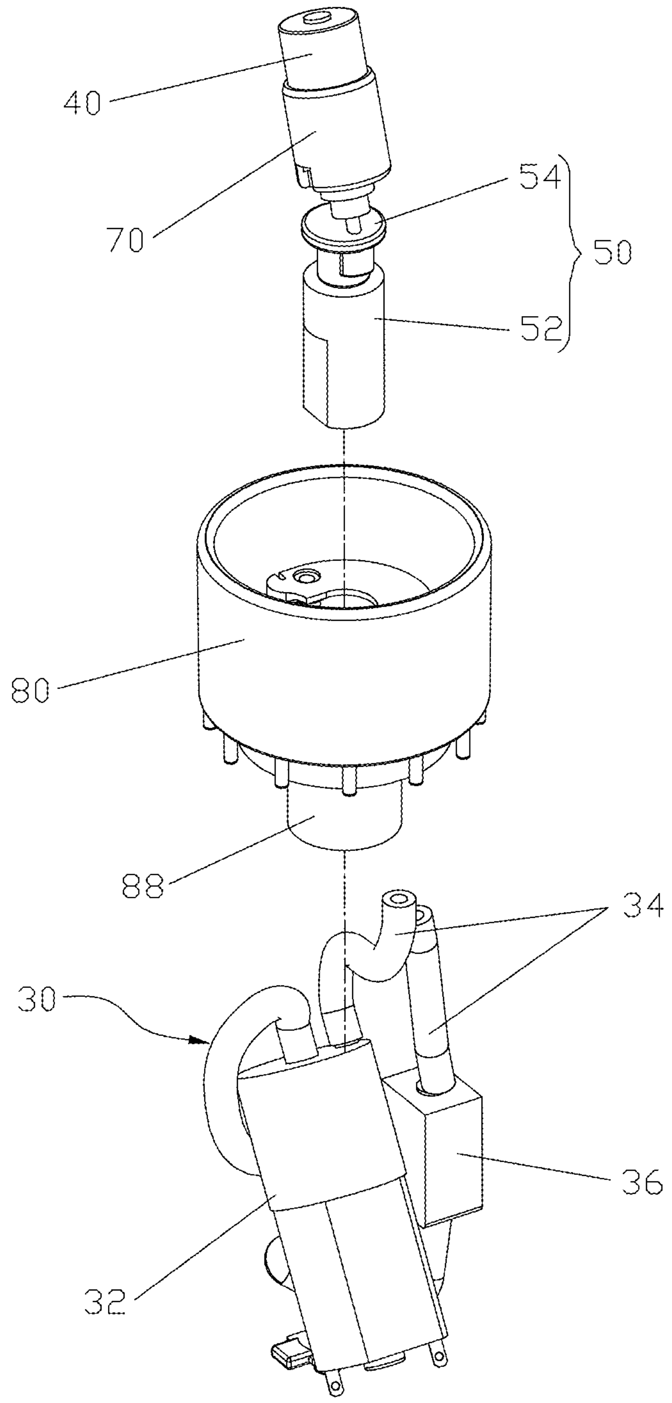
FIG. 5 is an exploded view of the driving assembly of the massage device of FIG. 1.

Referring also to FIG. 3*a* and FIG. 5, the driving assembly includes a pump module 30 configured for driving the inner wall 243 of the massage member 24 to generate deformation. The pump module 30 includes a pump, preferably an air pump 32, mounted in the main body 22 and pipelines 34 connecting the inlet/outlet of the air pump 32 to the second chamber 28. During operation, the air pump 32 supplies air into or sucks air from the second chamber 28, so that a pressure difference is generated between the second chamber 28 and the first chamber 26, which results in deformation of the inner wall 243 between the first chamber 26 and the second chamber 28.

Specifically, when the air pump 32 supplies air into the second chamber 28, the pressure in the second chamber 28 is increased to be larger than the pressure in the first chamber 26, the inner wall 243 is thus forced to shrink and adhere to the part of the human body in the inner wall 243 tightly, thereby producing a sucking effect to the part of the human body; and, when the air pump 32 sucks air from the second chamber 28, the pressure in the second chamber 28 is decreased to be less than the pressure in the first chamber 26, the inner wall 243 is thus forced to expand, thereby releasing the part of the human body in the inner wall 243.

That is, the pressure in the second chamber 28 can be repeatedly changed under the action of the air pump 32, and thus the inner wall 243 of the massage member 24 can be driven to reciprocate by the repeatedly change of the pressure in the second chamber 28, which brings repeated change in the pressure of the first chamber 26, producing a massage effect of sucking to the human body, which is more comfortable to the users. Such massage device is more suitable for stimulating external organs of the human body, such as the genitals including the penis, the scrotums, the clitoris, the labiums and the like, the breasts, and etc.

In this embodiment, as shown in FIG. 3*a*, a solenoid valve 36 is connected in series with the air pump 32 by the pipelines 34. The solenoid valve 36 is used to control a flowing direction and/or flow rate of the air in the pipelines 34, and a control circuit board 90 (referring to FIG. 2) may be provided in main shell 20 and electrically connected to the solenoid valve 36 to control the operation of the solenoid valve 36, so that the control of the flow direction and/or flow rate of air in the pipelines 34 may be automated. Accordingly, the deformation (including amplitude, frequency and etc.) of the inner wall 243 can be controlled automatically.

For the present massage device 100, the inner wall 243 of the massage member 24 is deformed by pressure changing inside the second chamber 28 rather than that inside the first chamber 26. In this way, there is no need to form an opening on the inner wall 243 to connect the pipelines 34 of the air pump 32, resulting in better sealing effect of the first chamber 26 and better massage effect of the massage device 100. Furthermore, liquids in the first chamber 26, such as lubricants, will not pass through the inner wall 243 into the shell 20 and affect the safety of components, especially electronic components, mounted in the shell 20. Moreover, the absence of opening on the inner wall 243 facilitates the cleaning of the present massage device 100, making the use of this device healthier.

As shown in FIG. 2, in this embodiment, the inner wall 243 of the massage member 24 is configured with a general V-shaped cross section, and an inner diameter of the inner wall 243 (i.e., a diameter of the first chamber 26) decreases from its distal end (an end away from the main body 22) to its proximal end (an end close to the main body 22), wherein the proximal end is closed while the distal end is open. The massage member 24 with such configuration can fit the shape of the breasts better, especially suitable for women. It should be understood that the shape of the inner wall 243 may be designed according to the part of the human body to be massaged, and should not be limited as the specific embodiment.

As shown in FIG. 2, in this embodiment, the inner wall 243 is spaced from the outer wall 241 in the radial direction, and thus an annular space 29 is defined between the inner wall 243 and the outer wall 241. The annular space 29, which may be regarded as a part of the second chamber 28, provides sufficient space to facilitate deformation of the inner wall 243, therefore the inner wall 243 may have a larger deformation amplitude, further improving the stimulation effect of the massage member 24. Preferably, a thickness of the inner wall 243 in the radial direction is much less than that of the outer wall 241, further facilitating deformation of the inner wall 243

A tongue 245 protrudes from a central portion of the closed proximal end of the inner wall 243 into the first chamber 26, for stimulating the nipple, clitoris, and etc. The driving assembly further includes a vibration module 40, for example, a vibration motor, accommodated inside the tongue 245. The vibration motor 40 may be integrally fixed inside the tongue 245 during the injection molding process to form the massage member 24, or, the massage member 24 and the vibration motor 40 may be formed separately and then assembled together. During operation, the tongue 245 may vibrate along with the vibration motor 40 at a predetermined frequency, further enhancing the stimulation effect of the massage member 24.

Figure 6:
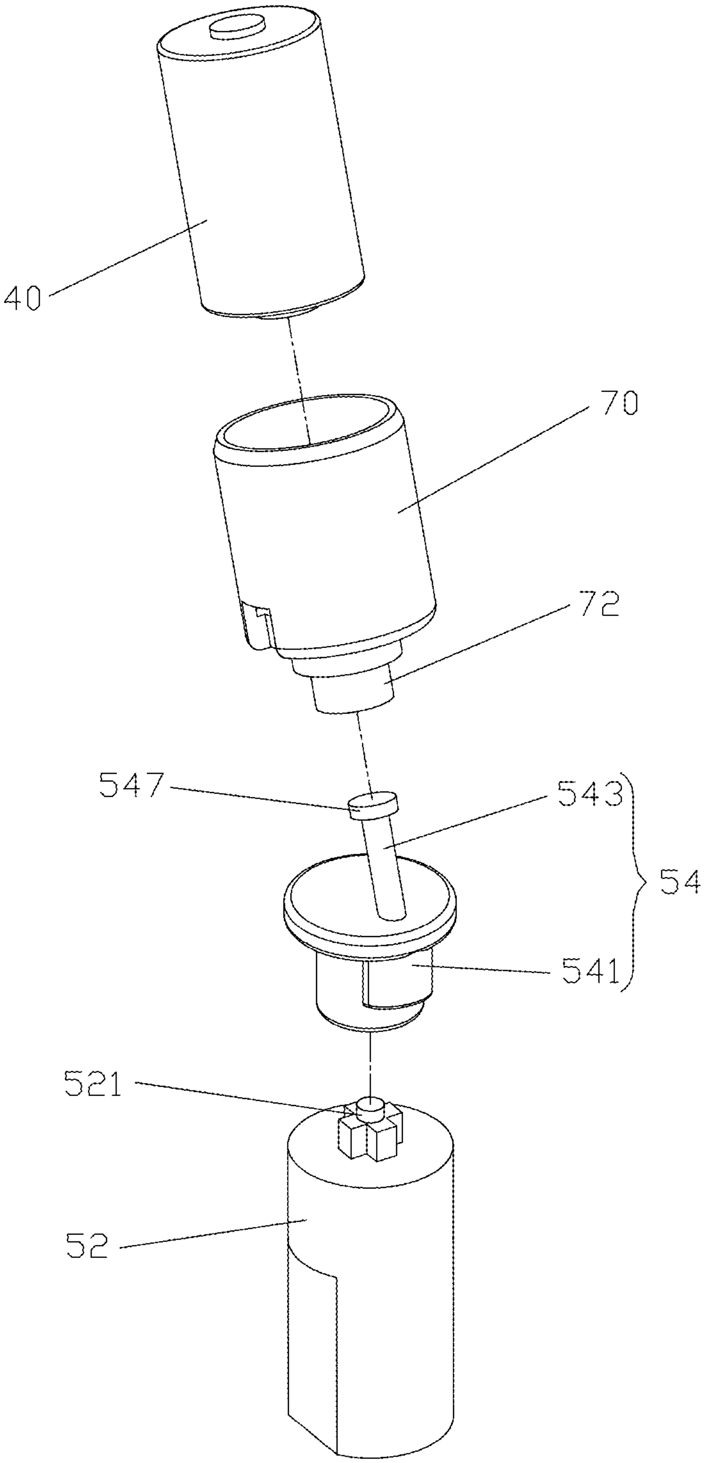
FIG. 6 is a further exploded view of a rotary module of the driving assembly of FIG. 5.
Figure 7:
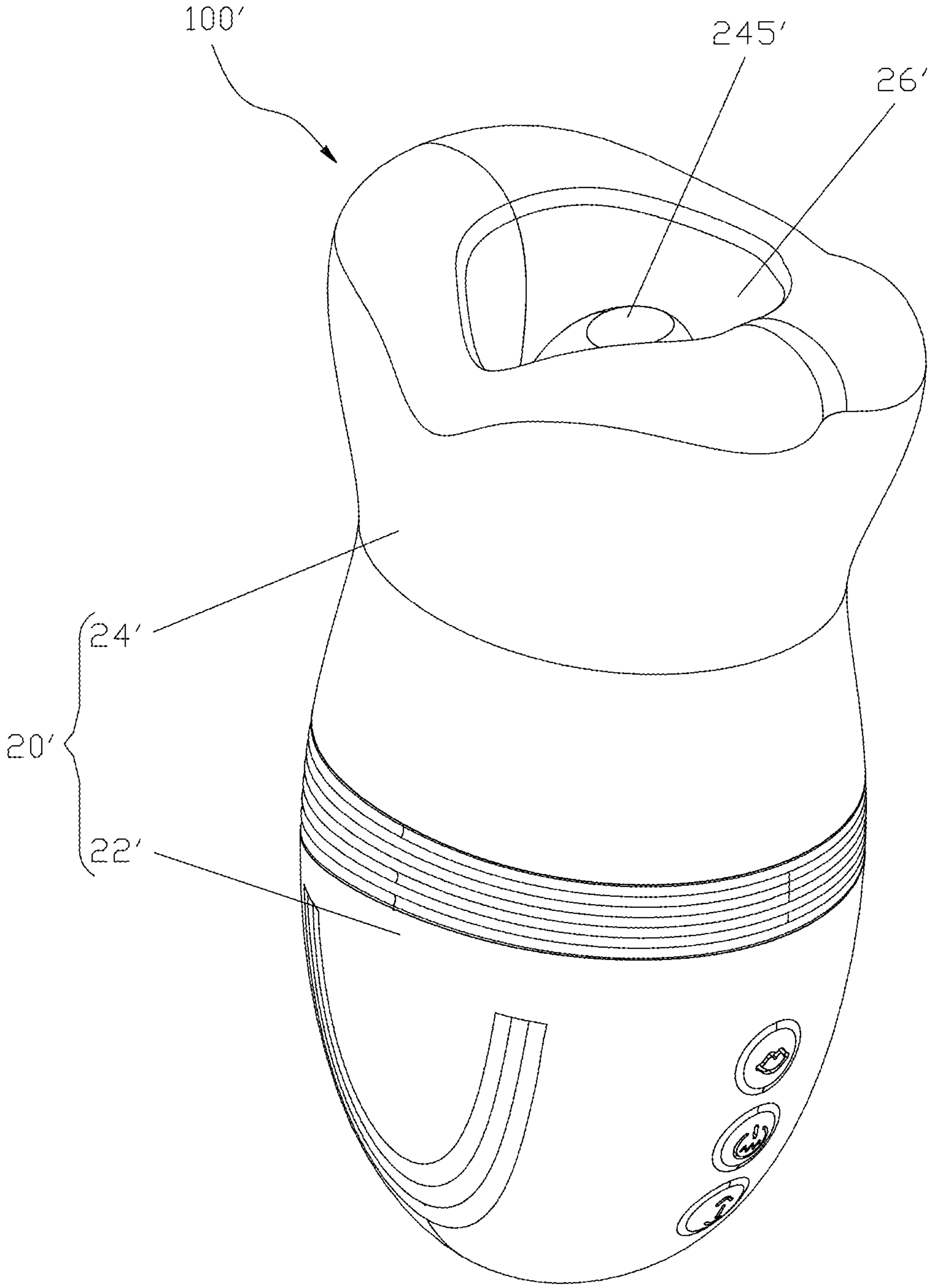
FIG. 7 is an isometric, assembled view of a massage device according to a second embodiment of the present application.
Figure 8:
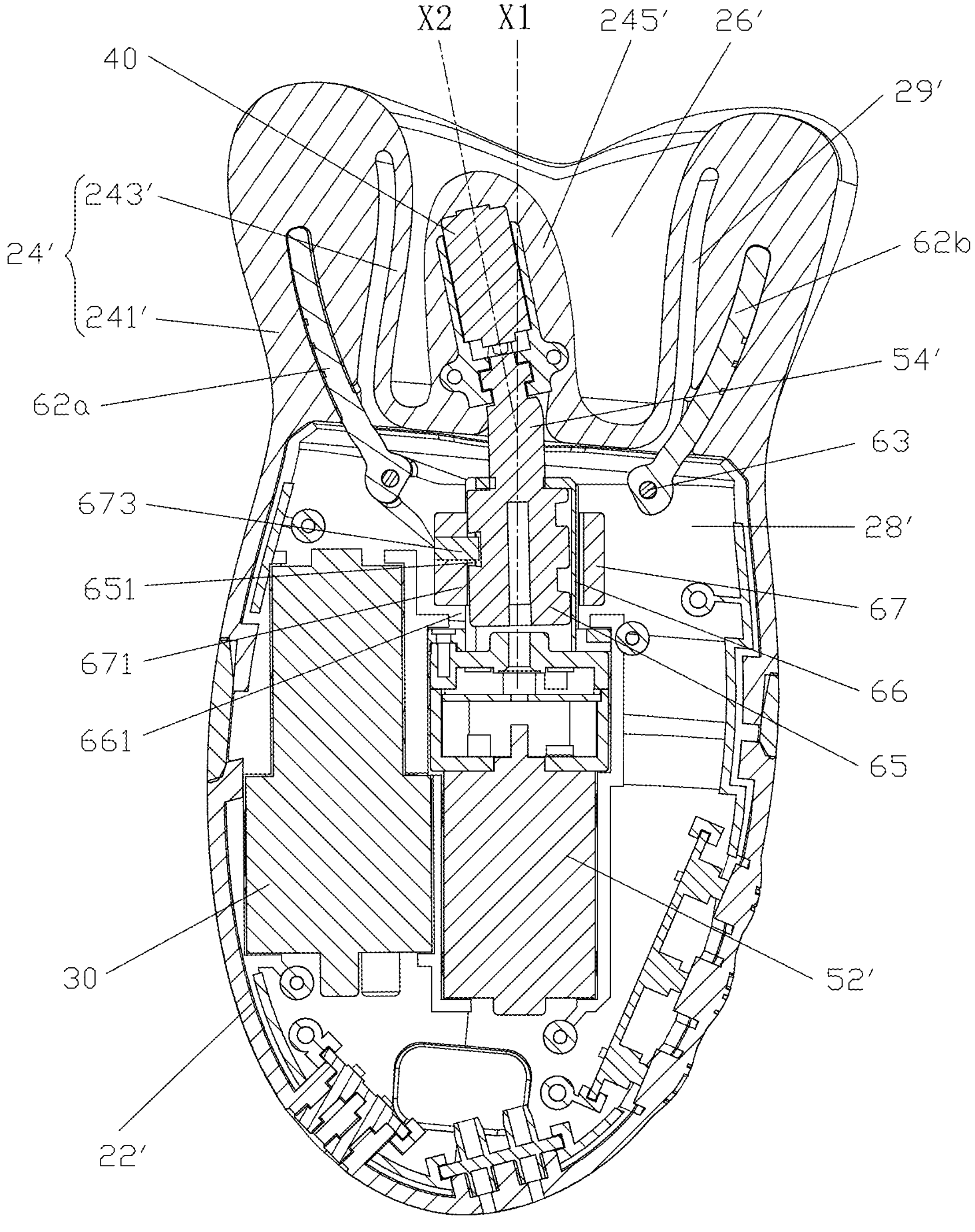
FIG. 8 is a cross sectional view of the massage device of FIG. 7.

As shown in FIG. 3 and FIG. 5, the driving assembly further includes a rotary module 50 configured for driving the tongue 245 of the massage member 24 to rotate. The rotary module 50 includes a driving source 52 and a rotary member 54 connected to the driving source 52 in a transmission way. The driving source 52 may be a rotary motor. Referring also to FIG. 6, the rotary member 54 includes a first rotary portion 541 and a second rotary portion 543, wherein the first rotary portion 541 is connected to an output shaft 521 of the driving source 52, and the second rotary portion 543 extends from the first rotary portion 541 into the tongue 245.

In this embodiment, the first rotary portion 541 of the rotary member 54 is configured as a wheel, which is mounted around the output shaft 521 of the driving source 52 and driven to rotate about a rotary axis X1, wherein the rotary axis X1 is generally collinear with a central axis of the inner wall 243 of the massage member 24. The second rotary portion 543 of the rotary member 54 is configured as an elongated rod, which extends obliquely from an outer periphery of the first rotary portion 541. As shown in FIG. 2, an included angle α, preferably an acute angle, is defined between the rotary axis X1 and the central axis X2 of the second rotary portion 543.

During operation, the first rotary portion 541 of the rotary member 54 is driven to rotate along with the output shaft 521 of the driving source 52 about the rotary axis X1, making the second rotary portion 543 revolve around the rotary axis X1, which in turn drives the tongue 245 connected to the second rotary portion 543 to revolve round the rotary axis X1. Thus, the rotary module 50 is able to drive the tongue 245 and the vibration motor 40 inside the tongue 245 to rotate relative to the inner wall 243, further enhancing the stimulation effect of the massage member 24 to the part of the human body inside the inner wall 243.

In this embodiment, the first rotary portion 541 and the second rotary portion 543 may be integrally formed as one piece, wherein a connection position of the first rotary portion 541 and the second rotary portion 543 is eccentrically relative to the rotary axis X1. In other embodiments, the first rotary portion 541 and the second rotary portion 543 of the rotary member 54 may be formed separately and then assembled together which is not limited in the present application. The first rotary portion 541 and the second rotary portion 543 may be fixed together by means of welding, interference fitting, snap-fitting and the like.

In other embodiments, the driving assembly may further include a swinging module configured for driving the tongue 245 to swing; or, include a linear module configured for driving the tongue 245 to reciprocate in the axial direction. It should be understood that as long as the tongue 245 can be driven to move, including but not limited to rotate, swing, reciprocate, and etc. by the driving module, the stimulation effect of the massage member 24 can be enhanced.

As shown in FIG. 2 and FIG. 6, a mounting frame 70 may be provided in the tongue 245 for connecting the second rotary portion 543 of the rotary member 54. The mounting frame 70 may be made of rigid materials, such as plastic, metal and etc., which has a relatively high strength, not only providing stable connection for the rotary member 54 and the tongue 245, but also improving power transmission efficiency between the rotary member 54 and the tongue 245. The tongue 245 generally wraps around the whole mounting frame 70, so as to provide a stable connection therebetween, and thus the rotary member 54 can drive the tongue 245 to rotate.

In this embodiment, the mounting frame 70 in whole is configured as a sleeve, and the vibration motor 40 is partly received in the mounting frame 70 and partly received in the tongue 245. Preferably, a mounting seat 72 protrudes outwardly from a bottom of the mounting frame 70, and a step hole 74 is defined in a central portion of the mounting seat 72. Correspondingly, an annular flange 547 is formed at the second rotary portion 543 and engaged into the step hole 74. By means of shape-fitting of the flange 547 and the step hole 74, the rotary member 54 is prevented from disengaging from the mounting frame 70.

For the above massage device 100, the inner wall 243 of the massage member 24 may produce a sucking effect on the human body under the driving of the pump module 30; and the tongue 245 of the massage member 24 may produce a vibration effect on the human body under the driving of the vibration module 40 and mimics a process of tongue licking on the human body under the driving of the rotary module 50, which provide a more comfortable stimulation. When the above massage device 100 is used to stimulate sensitive parts of the human body, such as the breasts and the genitalia, the users are more likely to reach orgasm.

Figure 4:
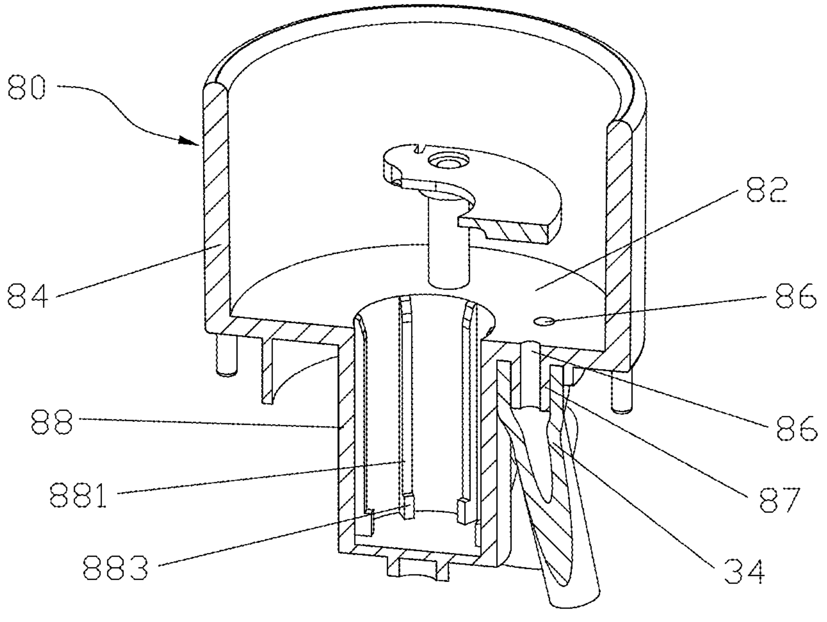
FIG. 4 is a cross sectional view of a support frame of the massage device of FIG. 1.

As shown in FIG. 4 and FIG. 5, a support frame 80 is provided inside the shell 20 to separate a third chamber 221 inside the main body 22 and the second chamber 28 inside the rotary member 24. The support frame 80 includes a substrate 82 coupled to a proximal side of the outer wall 241 and an annular sidewall 84 extending from an outer periphery of the substrate 82 into the outer wall 241. The second chamber 28 in formed among the outer wall 241, the inner wall 243, and the support frame 80. Openings 86 are defined in the substrate 82 for connecting the pipelines 34, thereby intercommunicating the second chamber 28 and the air pump 32.

Generally, there are two openings 86, one is configured as an inlet of the second chamber 28 and another is configured as an outlet of the second chamber 28. In this embodiment, as shown in FIG. 3*a* and FIG. 4, connecting poles 87 protrudes outwards from a side of the substrate 82 facing towards the main body 22, facilitating connection of the pipelines 34. Each connecting pole 87 is hollow and communicates with one of the openings 86. The two openings 86 may be positioned adjacent to each other, as shown in FIG. 4. In other embodiments, the openings 86 may be away from each other, as long as the pipelines 34 can be easily connected.

In this embodiment, the proximal end of the outer wall 241 extends beyond the proximal end of the inner wall 243 in the axial direction, and thus a space is formed between the proximal end of the inner wall 243 and the substrate 82 for mounting the rotary module 50. Preferably, a support seat 88 is concaved from a central portion of the substrate 82 into the third chamber 221 of the main body 22 for receiving the driving source 52 of the rotary module 50 therein, fully utilizing the space inside the shell 20, so that the overall structure is more compact. The openings 86 are arranged around the support seat 88.

As shown in FIG. 4, a plurality of ribs 881 is provided on an inner circumferential surface of the support seat 88. Each rib 881 is elongated and extends along an axial direction of the support seat 88. A tab 883 protrudes radially and inwardly from a bottom of each rib 881. The driving source 52 is supported by the tabs 883 and surround by the ribs 881, so as to be fixed inside the support seat 88. It should be understood that, the driving source 52 may be arranged at other positions, and transmission components, such as gears, may be provided between the driving source 52 and the rotary member 54.

As shown in FIG. 2 and FIG. 3, the main body 22 of the shell 20 is configured as a double layer structure, and includes a rigid inner layer 22*a* and a flexible outer layer 22*b* covered on the inner layer 22*a*. The inner layer 22*a* provides supports for the driving assembly, and the outer layer 22*b* provides soft touch for the users. The substrate 82 of the support frame 80 may be fixed to the inner layer 22*a* by screws, the sidewall 84 of the support frame 80 may be inserted into and fixed to the proximal end of the outer wall 241 by interference fit, and the outer wall 241 may be connected to the outer layer 22*b* in a sealed manner.

In this embodiment, the main body 22 of the shell 20 is configured as a handle with several buttons 223 provide thereon. The buttons 223 may be mechanical buttons or touch buttons, configured for input the user's instructions. Electronic components of the driving assembly, such as the solenoid valve 36, the vibration motor 40, the driving source 52, and etc. are electrically connected to the buttons 223 through the control circuit board 90, so that the operation of the massage device 100, such as the on/off of the solenoid valve 36, the vibration frequency of the vibration motor 40, the rotary speed of the driving source 52, and etc. can be controlled according to the user's instructions.

A battery 92, preferably a rechargeable battery, is arranged in the main body 22 of the shell 20 and electrically connected to the control circuit board 90 for supplying electric power to the electric components inside the shell 20.

Referring to FIG. 7 to FIG. 11, a massage device 100' according to an alternative embodiment of the present application is shown.

In this embodiment, the massage device 100' includes a shell 20' and a driving assembly mounted in the shell 20'. The shell 20' includes a main body 22' and a massage member 24' provided at a distal end of the main body 22'. The massage member 24' includes an outer wall 241' and an inner wall 243' concaved inwardly from a distal end of the outer wall 241'. A first chamber 26' is defined in the inner wall 243', and a second chamber 28' is defined in the shell 20' and around the inner wall 243'. The first chamber 26' and the second chamber 28' are not communicated with each other due to the separation of the inner wall 243'.

In this embodiment, the massage member 24', specifically the outer wall 241' of the massage member 24' is configured as a mouth, and includes two clamping portions 24*a*', 24*b*' that are opposite to each other. Two connection positions 240' at ends of the two clamping portions 24*a*', 24*b*' are generally V-shaped. The inner wall 243' is generally U-shaped in cross section. An annular space 29' is defined between the inner wall 243' and the outer wall 241' for facilitate deformation of the inner wall 243'. A tongue 245' extends from a central portion of a proximal end of the inner wall 243' into the first chamber 26'.

In this embodiment, the driving assembly includes a pump module 30, a vibration module 40, a rotary module 50' and a clamping module 60. The pump module 30 includes an air pump 32 configured for supplying air into or sucking air from the second chamber 28'; the vibration module 40 includes at least one vibration motor embedded in the tongue 245'. Details for the pump module 30 and the vibration module 40 may refer to that in the first embodiment, which will not be repeated here.

In this embodiment, the rotary module 50' includes a driving source 52' and a rotary member 54' being driven to rotate about a rotary axis X1 by the driving source 52', wherein the rotary axis X1 is generally collinear with a central axis of the inner wall 243' of the massage member 24'. The driving source 52' may be a gearbox, and includes a rotary motor 523' and a reduction gear unit 525' connected to the rotary motor 523'. A speed of an output shaft 521' of the driving source 52' preferably does not exceed 1000 rpm.

The rotary member 54' includes a first rotary portion 541' connected to the output shaft 521' of the driving source 52', and a second rotary portion 543' extending obliquely from the first rotary portion 541' into the tongue 245', wherein a central axis X2 of the second rotary portion 543' is inclined to the rotary axis X1. In this embodiment, the first rotary portion 541' and second rotary portion 543' are integrally formed as one piece. Similarly, a mounting frame 70 is provided in the tongue 245' for connecting the rotary member 54'. During operation, the driving source 52' drives the tongue 245' and the vibration module 40 to revolve around the rotary axis X1.

Figure 9:
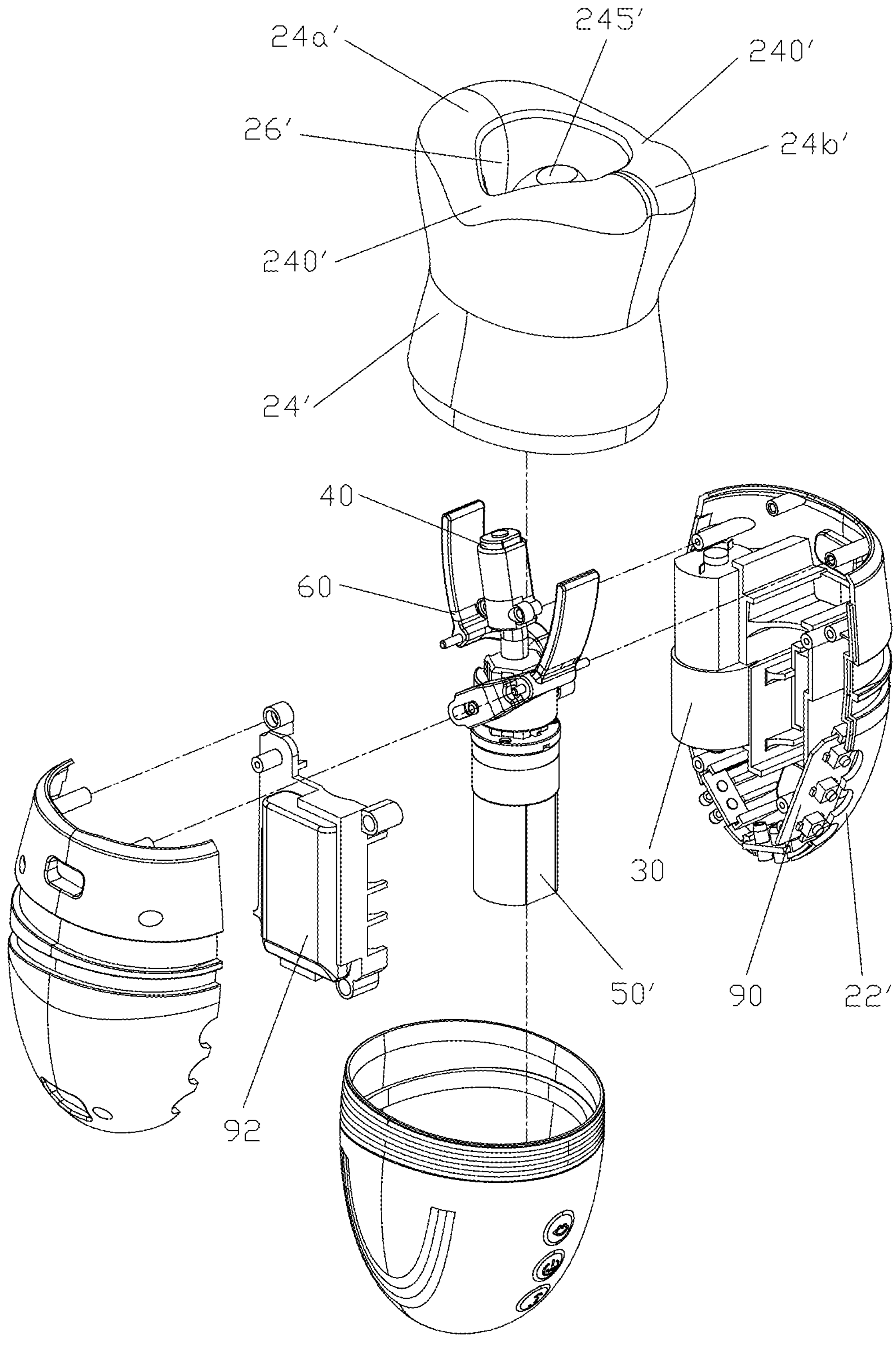
FIG. 9 is an exploded view of the massage device of FIG. 7.
Figure 10:
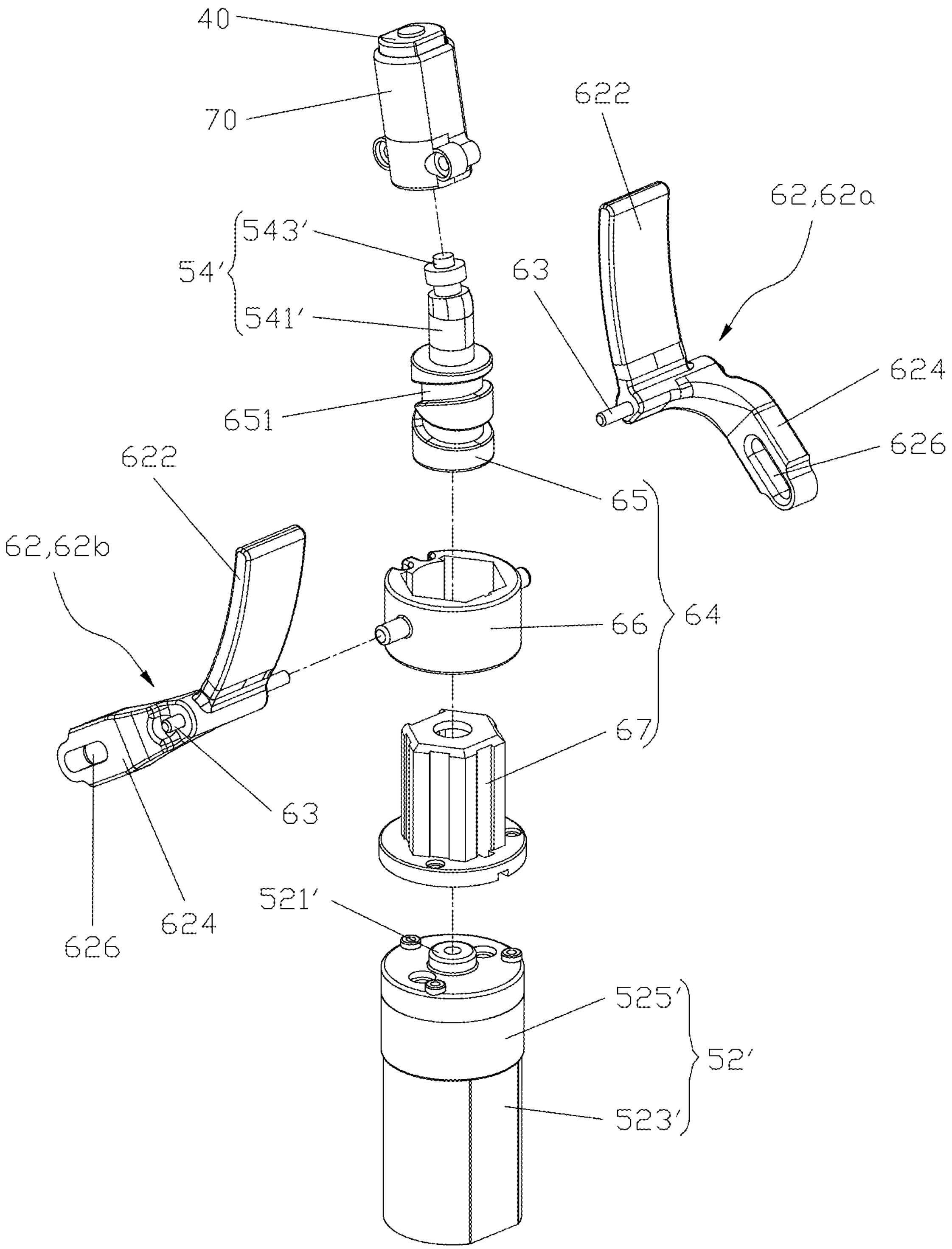
FIG. 10 is a further exploded view of a driving assembly of the massage device of FIG. 7.

Referring to FIG. 9 and FIG. 10, the clamping module 60 includes a driving component, a swinging unit 62 and a transmission unit 64 connected between the driving component and the swinging unit 62. The driving component of the clamping module 60 may be a rotary motor, a gearbox and the like.

The swinging unit 62 includes two swinging bars 62*a*, 62*b* being arranged opposite to each other. Each swinging bar 62*a*, 62*b* is rotatably connected to the shell 20' by a first pivot 63. In this embodiment, the swinging bar 62*a*, 62*b* is generally sheet-like and elongated. One end of the swinging bar 62*a*, 62*b*, preferably an end away from the first pivot 63, is configured as a swinging end 622 and extends into one of the clamping portions 24*a*', 24*b*' of the massage member 24'; and, another end of the swinging bar 62*a*, 62*b*, preferably an end adjacent to the first pivot 63, is configured as a connecting end 624 for connecting the transmission unit 64.

Figure 11:
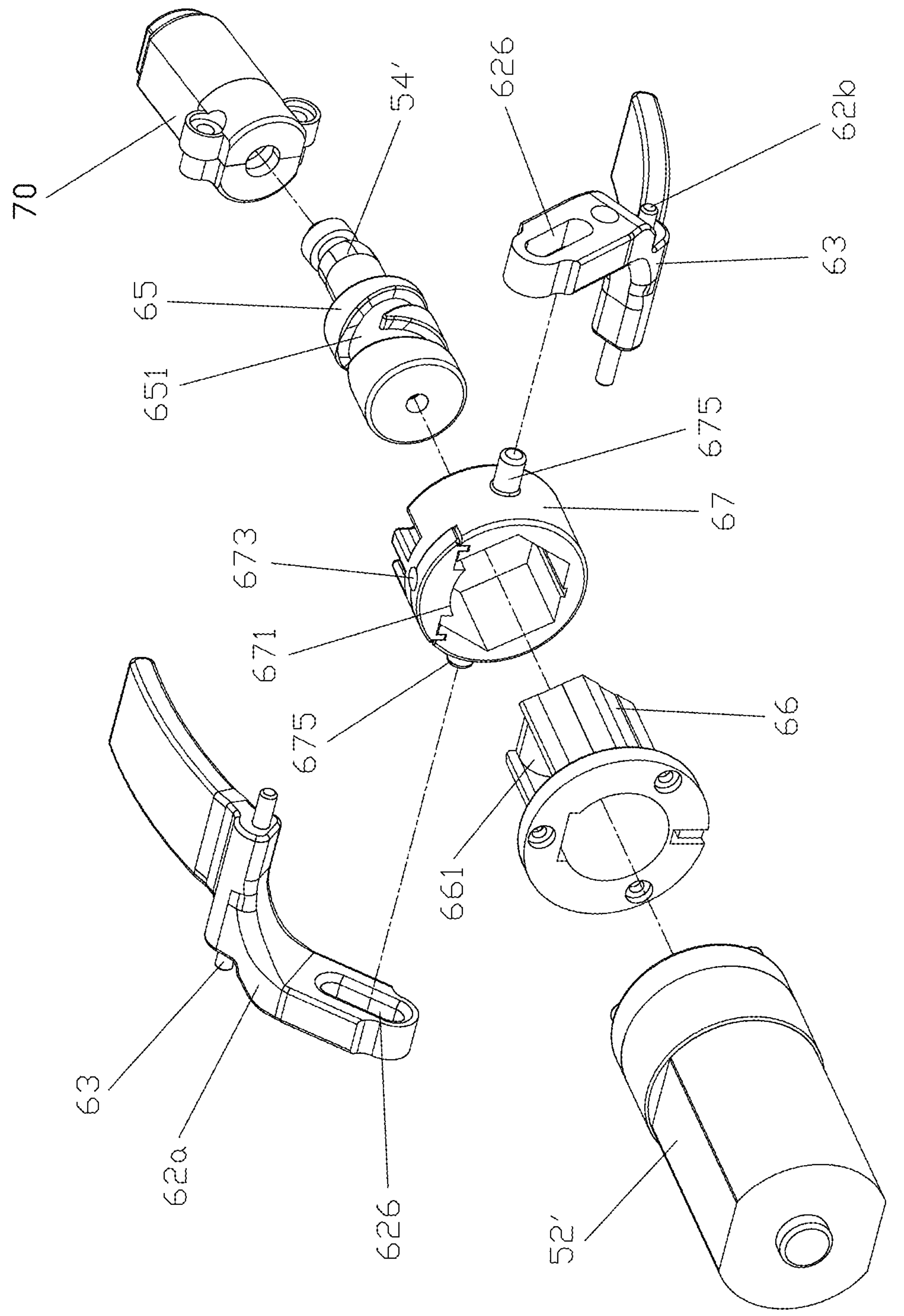
FIG. 11 is similar to FIG. 10, but viewed from another aspect.

The transmission unit 64 is configured for converting rotation of the driving component into reciprocating linear movement. As shown in FIG. 10 and FIG. 11, the transmission unit 64 includes a rotary rod 65, a fixed member 66, and a sliding member 67. In this embodiment, the rotary rod 65 is integrally connected to the first rotary portion 541' of the rotary member 54' of the rotary module 50'. In other words, a portion of the first rotary portion 541' acts as the rotary rod 65 of the transmission unit 64. Therefore, the driving source 52 of the rotary module 50 not only drives the tongue 245' to rotate through the rotary member 54', but also drives the clamping portions 24*a*, 24*b* to swing through the swinging unit 62 and the transmission unit 64 configured with the rotary rod 65/rotary member 54'.

From above, the rotary module 50' and the clamping module 60 are driven by the same component, which can reduce the driving components for the massage device 100' and thus save costs. In other embodiments, the rotary module 50' and the clamping module 60 may be driven by two different driving components, respectively, so that the modules 50', 60 can be controlled separately, further facilitating user use. In this situation, the rotary member 54' and the rotary rod 65 may be formed as two separate components.

The fixed member 66 is fixedly mounted in the shell 20', such as fixed to a gear housing of the driving source 52. A first sliding groove 661 which extends in an axial direction of the rotary rod 65 is defined in the fixed member 66. The rotary rod 65 is rotatably mounted inside the fixed member 66, and a second sliding groove 651 which extends spirally in a circumferential direction is defined in the rotary rod 65. Preferably, the second sliding groove 651 is axisymmetric about the rotary axis X1 of the rotary member 54'. The sliding member 67 cooperates with the first sliding groove 661 and second sliding groove 651 simultaneously, converting the rotation of the rotary rod 65 into reciprocating linear motion of the sliding member 67 in the axial direction of the rotary rod 65.

In this embodiment, the sliding member 67 is configured as a hollow sleeve and slidably mounted around the fixed member 66. A first sliding portion 671 protrudes inwardly and radially from the sliding member 67 and slidably engages into the first sliding groove 645, and a second sliding portion 673 protrudes inwardly and radially from the first sliding portion 671 and slidably engages into the second sliding groove 651. The first sliding groove 661 extends through a circumferential wall of the fixed member 66, so that the second sliding portion 673 can extend through the first sliding groove 661 into the second sliding groove 651.

During operation, the rotary rod 65 is driven to rotate about the rotary axis X1, the second sliding portion 673 engaged in the second sliding groove 651 of the rotary rod 65 makes the sliding member 67 have a tendency to rotate about the rotary axis X1. However, the first sliding portion 671 engaged in the first sliding groove 661 of the fixed member 66 makes the sliding member 67 cannot rotate. Therefore, the first sliding portion 671 slides along the first sliding groove 661 and the second sliding portion 673 slides along the second sliding groove 651, making the sliding member 67 move up and down in the axial direction of the rotary rod 65.

In this embodiment, the first sliding portion 671 and the second sliding portion 673 are formed separately and then assembled onto the sliding member 67, facilitating assembly of the fixed member 66, the rotary rod 65, and the sliding member 67. In other embodiments, the first sliding portion 671 and/or second sliding portion 673 may be integrally formed with the sliding member 67, and, the first sliding portion 671 and second sliding portion 673 may be integrally formed as one piece.

In this embodiment, two second pivots 675 extend outwards and radially form two opposite sides of the sliding member 67, respectively. An elongated groove 626 is provided at a distal position of the connecting end 624 of each swinging bar 62*a*, 62*b* for accommodating a corresponding second pivot 675 therein. After assembled, each second pivot 675 is movably and rotataly engaged into the elongated groove 626 of one of the swinging bars 24*a*, 24*b*, being parallel to and spaced from the first pivot 63 of the corresponding swinging bars 24*a*, 24*b*.

During operation, the linear motion of the sliding member 67 in the axial direction of the rotary rod 65 makes the swinging bars 24*a*, 24*b* swing about the second pivots 675 in a plane perpendicular to the second pivots 675 in opposite directions, thereby driving the clamping portions 24*a*', 24*b*' to swing towards each other or away from each other. Preferably, the swinging ends 622 extend into the outer wall 241' of the massage member 24' which is thick enough, and the inner wall 243' can swing together with the outer wall 241' to knead the human body in the first chamber 26', which is similar to a pinch motion of the human hand, providing a more comfortable sexual stimulation to the human body.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device comprising:

a shell comprising a main body and a massage member provided at one end of the main body, the massage member comprising an outer wall and an inner wall extending inwardly from a distal end of the outer wall, a first chamber being defined in the inner wall for accommodating a part of a human body to be massaged therein, a second chamber being defined in the shell and around the inner wall, wherein the first chamber is not communicated with the second chamber; and a pump being mounted inside the shell and connected to the second chamber by pipelines, configured for supplying air into the second chamber or sucking air from the second chamber through the pipelines;

wherein a tongue extends from a proximal end of the inner wall into the first chamber, and a vibration motor is mounted inside the tongue;

wherein a driving source is mounted in the second chamber, and a rotary member is connected to the driving source in a transmission way and extends into the tongue to drive the tongue to rotate; and a support frame is coupled to a proximal end of the outer wall, and the second chamber is defined among the inner wall, the outer wall and the support frame; the pump is mounted in a third chamber defined by the support frame and the main body of the shell, and openings are defined in the support frame for connecting the pipelines of the pump to the second chamber.

2. The massage device according to claim 1, wherein an annular space is defined between the inner wall and the outer wall for facilitating deformation of the inner wall when the pump supplies air into the second chamber or sucks air from the second chamber.

3. The massage device according to claim 1, wherein the rotary member comprises a first rotary portion connected to the driving source and a second rotary portion being inclined to a central axis of the inner wall, and the second rotary portion extends into the tongue to drive the tongue to revolve around the central axis of the inner wall.

4. The massage device according to claim 3, wherein a rotary axis of the first rotary portion is substantially collinear with the central axis of the inner wall.

5. The massage device according to claim 1, wherein the support frame comprises a substrate and an annular sidewall extending from a periphery of the substrate into the proximal end of the outer wall, and a support seat is concaved from a central portion of the substrate into the main body for receiving a driving source which is configured for driving a central portion of the inner wall to move therein, and the openings are defined in the substrate and around the support seat.

6. The massage device according to claim 1, wherein the outer wall comprises two clamping portions being arranged opposite to each other, and two swinging bars are rotatably mounted in the second chamber of the shell, respectively; each of the two swinging bars comprises a swinging end extending into one of the two clamping portions and a connecting end connected to the driving source in a transmission way.

7. The massage device according to claim 6, further comprising a rotary rod, a fixing member being fixed in the shell and mounted around the rotary rod and a sliding member mounted around the fixing member, wherein the fixing member defines a first sliding groove extending along an axial direction of the rotary rod, a second sliding groove is defined in the rotary rod and extends spirally in a circumferential direction of the rotary rod, and the sliding member comprises a first sliding portion engaged into the first sliding groove and a second sliding portion engaged into the second sliding groove.

8. The massage device according to claim 7, wherein the rotary rod is integrally formed with the rotary member.

9. The massage device according to claim 7, wherein two rods extends outwardly and radially from two opposite sides of the sliding member into the connecting ends of the two swinging bars, respectively.

10. The massage device according to claim 6, wherein connecting positions of the two clamping portions are substantially V-shaped.

11. The massage device according to claim 1, wherein a radial thickness of the inner wall is less than that of the outer wall.

12. The massage device according to claim 1, wherein a cross section of the inner wall is substantially V-shaped or U-shaped.

13. A massage device comprising:

a shell comprising a main body and a massage member provided at an end of the main body, the massage member comprising an outer wall and an inner wall concaved inwardly from a distal end of the outer wall, the outer wall of the massage member comprising two clamping portions being arranged opposite to each other;

a first chamber being defined in the inner wall for accommodating a part of a human body to be massaged therein;

a second chamber being defined in the shell and around the inner wall and not communicated with the first chamber;

a pump being mounted inside the main body of the shell with an air inlet and/or an air outlet thereof being communicated with the second chamber for supplying air into the second chamber and/or sucking air from the second chamber; and a driving assembly comprising a driving source mounted in the main body and two swinging bars being rotatably connected to the shell, respectively; each of the two swinging bars comprising a swinging end extending into one of the two clamping portions of the outer wall and a connecting end connected to the driving source in a transmission way.

14. The massage device according to claim 13, wherein a tongue extends from a proximal end of the inner wall into the first chamber, and a rotory member is connected between the driving source and the tongue for driving the tongue to rotate.

15. The massage device according to claim 14, wherein the rotary member comprises a first rotary portion connected to the driving source and a second rotary portion being inclined to a central axis of the inner wall, and the second rotary portion extends into the tongue to drive the tongue to revolve around the central axis of the inner wall.

16. The massage device according to claim 13, wherein connecting positions of the two clamping portions are substantially V-shaped.

17. The massage device according to claim 13, wherein the pump is an air pump, and a solenoid valve is connected in series with the air pump by pipelines.

18. The massage device according to claim 14, further comprising a rotary rod connected to the rotary member, a fixing member being fixed in the shell and mounted around the rotary rod and a sliding member mounted around the fixing member, wherein the fixing member defines a first sliding groove extending along an axial direction of the rotary rod, the rotary rod defines a second sliding groove extending spirally in a circumferential direction of the rotary rod, and the sliding member comprises a first sliding portion engaged into the first sliding groove and a second sliding portion engaged into the second sliding groove.

19. The massage device according to claim 18, wherein the rotary rod is integrally formed with the rotary member.

20. The massage device according to claim 18, wherein two rods extends outwardly and radially from two opposite sides of the sliding member into the connecting ends of the two swinging bars, respectively.

* * * * *